(12) United States Patent
Noh (10) Patent No.: US 7,801,052 B2
(45) Date of Patent: Sep. 21, 2010

(54) APPARATUS FOR MEASURING TRANSMISSION DELAY

(75) Inventor: Yong-hwan Noh, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 270 days.

(21) Appl. No.: 11/905,260

(22) Filed: Sep. 28, 2007

(65) Prior Publication Data

US 2008/0101249 A1 May 1, 2008

(30) Foreign Application Priority Data

Nov. 1, 2006 (KR) ...................... 10-2006-0107474

(51) Int. Cl.
*G01R 31/08* (2006.01)
(52) U.S. Cl. ...................... 370/249; 370/252
(58) Field of Classification Search ................. 370/249; 368/120
See application file for complete search history.

(56) References Cited

U.S. PATENT DOCUMENTS

| 6,075,418 | A  | * | 6/2000  | Kingsley et al. ............... 331/57 |
| 6,219,305 | B1 | * | 4/2001  | Patrie et al. .................. 368/113 |
| 6,223,314 | B1 | * | 4/2001  | Arabi et al. .................. 714/726 |
| 6,437,553 | B1 | * | 8/2002  | Maloney et al. ........... 324/76.35 |
| 7,023,233 | B1 |   | 4/2006  | Furukawa |
| 7,119,570 | B1 | * | 10/2006 | Chirania et al. ............. 324/765 |
| 2003/0197677 | A1 | * | 10/2003 | Hulvey ........................ 345/156 |
| 2005/0028050 | A1 | * | 2/2005  | Ganry ........................ 714/700 |

FOREIGN PATENT DOCUMENTS

| JP | 2004-157090 | 6/2004 |
| JP | 2004-163287 | 6/2004 |

* cited by examiner

*Primary Examiner*—Kwang B Yao
*Assistant Examiner*—Jung Liu
(74) *Attorney, Agent, or Firm*—Harness, Dickey & Pierce, P.L.C.

(57) ABSTRACT

A transmission delay measuring circuit may include a first transmission path, a second transmission path, an inversion circuit, a first multiplexer, and an output terminal. The second transmission path may have the same structure as the structure of the first transmission path and may receive the output of the first transmission path. The inversion circuit may invert the output of the second transmission path. The first multiplexer may output one of the external input signal and an inverted output of the second transmission path to the first transmission path in response to a test mode enable signal. The output terminal may output, as a measuring signal, a signal in an arbitrary node of a closed loop formed of the first transmission path, the second transmission path, the inversion circuit, and the first multiplexer. The transmission delay measuring apparatus may more accurately measure the transmission delay of a transmission path in a semiconductor device in a die-to-die wafer state or a package state.

6 Claims, 3 Drawing Sheets

APPARATUS FOR MEASURING TRANSMISSION DELAY

PRIORITY STATEMENT

This application claims priority under 35 USC §119 to Korean Patent Application No. 2006-0107474, filed on Nov. 1, 2006, in the Korean Intellectual Property Office (KIPO), the entire contents of which are herein incorporated by reference.

BACKGROUND

1. Field

Example embodiments relate to an apparatus for measuring a transmission delay of a transmission path in a semiconductor device by using a replicate transmission path having the same structure as that of the transmission path whose transmission delay is to be measured.

2. Description of Related Art

When developing a semiconductor device, it is important to consider the aim of the design of the semiconductor device. For example, the timing margin of a signal transmission path in a semiconductor device is an important factor in determining the operating speed of the device and is also important in terms of yield.

An actual transmission delay time, during which signal transmission via a transmission path is delayed due to various factors (e.g., a variety of components existing on the transmission path and the resistance and capacitance of wires), is different from the delay time obtained by a simulation. When components are scaled down during a semiconductor manufacturing process, the timing change within the device accordingly increases. Thus, in order to increase productivity, a designer needs to ascertain the actual timing value (e.g., a transmission delay) of the desired circuitry of each of the implemented chips.

Figure 1:
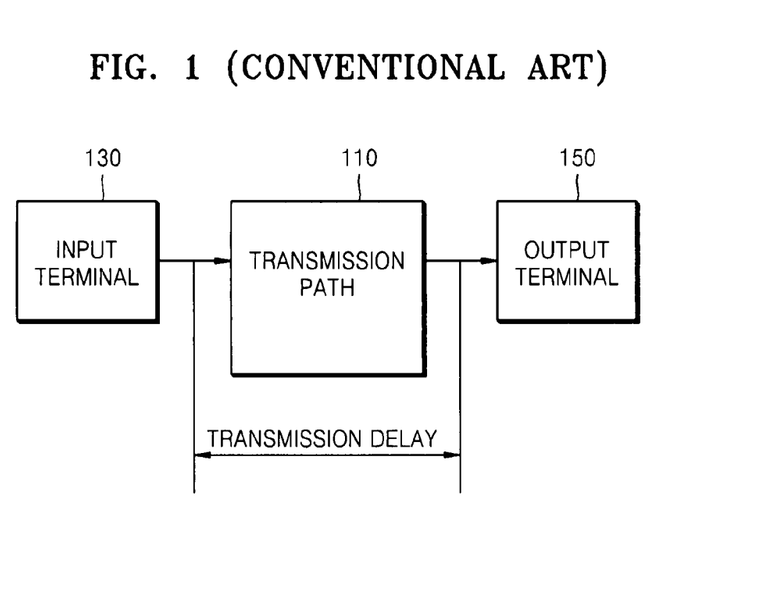
FIG. 1 is a block diagram illustrating a transmission delay.

FIG. 1 is a block diagram illustrating a transmission delay. Referring to FIG. 1, a semiconductor chip includes an input terminal 130 in which a signal transmitted from another circuit existing outside or inside the semiconductor chip is received as an input signal, a transmission path 110 in which the input signal is transmitted, and an output terminal 150 in which the transmitted input signal is output as an output signal.

In order to measure the transmission delay of the transmission path 110, the time ranging from when the input signal is input to the transmission path 110 to when the output signal is output from the transmission path 110 is measured. However, it is difficult to precisely measure the actual time between when the input signal is input to the transmission path 110 and when the output signal is output from the transmission path 110.

In conventional methods, when transmission circuits whose transmission delays are to be measured are apart from each other within the chip, an error may be generated due to the delay generated in the interconnection line when making a closed loop. Furthermore, a sum of the time during which the logic level of a signal input to a transmission circuit transitions from a low level to a high level and a time during which the logic level of the signal transitions from a high level to a low level may be measured. As such, there remains a demand for a system that may more accurately measure the delay by removing the interconnection line parasitically generated when making a closed loop and that may separately measure a time during which the logic level of a signal input to the transmission circuit transitions from a lower level to a high level and a time during which the logic level of the signal transitions from a high level to a low level.

SUMMARY

Example embodiments provide an apparatus for measuring the transmission delay of a transmission path in a semiconductor device by using a replicate transmission path having the same structure as that of the transmission path whose transmission delay is to be measured.

According to example embodiments, a transmission delay measuring circuit may include a first transmission path, a second transmission path, an inversion circuit, a first multiplexer, and an output terminal. The second transmission path may have the same structure as the structure of the first transmission path and may receive the output of the first transmission path. The inversion circuit may invert the output of the second transmission path. The first multiplexer may output one of an external input signal and an inverted output of the second transmission path to the first transmission path in response to a test mode enable signal. The output terminal may output, as a measuring signal, a signal in an arbitrary node of a closed loop formed of the first transmission path, the second transmission path, the inversion circuit, and the first multiplexer.

The inversion circuit may be located in the input terminal of the second transmission path, in the output terminal of the second transmission path, or within the second transmission path.

The number of first transmission paths and the number of second transmission paths may each be at least one.

The transmission delay measuring circuit may further include a second multiplexer which may transmit the output of the first transmission path to the second transmission path in response to a test mode start signal.

The transmission delay measuring circuit may also further include a startup signal generation unit which may output a startup signal that may be activated in response to the test mode enable signal and the test mode start signal. The second multiplexer may transmit the output of the first transmission path to the second transmission path in response to the startup signal.

When at least two first transmission paths are included, at least two second transmission paths and at least two test mode enable signals may be accordingly included. The first multiplexer may output an inverted output of the second transmission path to a corresponding first transmission path in response to an activated test mode enable signal from among the test mode enable signals. The second multiplexer may output the output of the corresponding first transmission path to the corresponding second transmission path in response to the activated test mode enable signal.

The transmission delay measuring circuit may further include a third multiplexer which may output to the output terminal in response to the activated test mode enable signal, a signal in an arbitrary node of a closed loop formed of the first multiplexer, the corresponding first transmission path, the second multiplexer, the corresponding second transmission path, and the inversion circuit.

The transmission delay measuring circuit may further include a frequency division unit which may output a signal whose logic level transitions each time the measuring signal changes for N cycle(s).

The transmission delay measuring circuit may further include a pad which may output the measuring signal to an external measuring apparatus.

According to example embodiments, a transmission delay measuring circuit may include a first transmission path, a second transmission path, a first multiplexer, a second multiplexer, a pulse generation unit, and an output terminal. The second transmission path may have the same structure as the structure of the first transmission path. The first multiplexer may output either one of an external input signal and an inverted output of the second transmission path or one of the external input signal and the output of the second transmission path according to a change or non-change between logic states of the input and the output of the first transmission path in response to a test mode enable signal. The second multiplexer may transmit the output of the first transmission path in response to a test mode start signal. The pulse generation unit may generate a pulse in response to a change in the logic state of the output of the second multiplexer and output the pulse to the second transmission path. The output terminal may output, as a measuring signal, a signal in an arbitrary node of a closed loop formed of the first multiplexer, the first transmission path, the second multiplexer, the pulse generation unit, and the second transmission path.

The transmission delay measuring circuit may further include a startup signal generation unit which may output a startup signal that may be activated in response to the test mode enable signal and the test mode start signal. The second multiplexer may transmit the output of the first transmission path in response to the startup signal.

The number of first transmission paths and the number of second transmission paths may each be at least one.

When at least two first transmission paths are included, at least two second transmission paths and at least two test mode enable signals are accordingly included. The first multiplexer may output either the output of the second transmission path or an inverted output of the corresponding second transmission path to a corresponding first transmission path in response to an activated test mode enable signal from among the test mode enable signals. The second multiplexer may output the output of the pulse generation unit to the corresponding second transmission path in response to the activated test mode enable signal.

The transmission delay measuring circuit may further include a third multiplexer which may output to the output terminal, in response to the activated test mode enable signal, a signal in an arbitrary node of a closed loop formed of the first multiplexer, the corresponding first transmission path, the second multiplexer, the pulse generation unit, and the corresponding second transmission path.

The transmission delay measuring circuit may further include an inversion circuit which may invert the output of the second transmission path.

The inversion circuit may be located in the input terminal of the second transmission path, in the output terminal of the second transmission path, within the second transmission path, in the input terminal of the pulse generation unit, or in the output terminal of the pulse generation unit.

The transmission delay measuring circuit may further include a frequency division unit which may output a signal whose logic level transitions each time the measuring signal changes for N cycle(s).

The transmission delay measuring circuit may further include a pad which may output the measuring signal to an external measuring apparatus.

According to example embodiments, a transmission delay measuring circuit may include a first transmission path, a first multiplexer, a second multiplexer, a pulse generation unit, and an output terminal. The second multiplexer may transmit the output of the first transmission path in response to a test mode start signal. The pulse generation unit may generate a pulse in response to a transition of the logic state of the output of the second multiplexer and output the pulse. The first multiplexer may output either one of an external input signal and an inverted output of the pulse generation unit or one of the external input signal and the output of the pulse generation unit according to a change or non-change between logic states of the input and the output of the first transmission path in response to a test mode enable signal. The output terminal may output, as a measuring signal, an output of an arbitrary node of a closed loop formed of the first multiplexer, the first transmission path, the second multiplexer, and the pulse generation unit.

The transmission delay measuring circuit may further include a startup signal generation unit which may output a startup signal that may be activated in response to the test mode enable signal and the test mode start signal. The second multiplexer may transmit the output of the first transmission path to the pulse generation unit in response to the startup signal.

The number of first transmission paths may be at least one.

When at least two first transmission paths are included, at least two test mode enable signals are accordingly included. The first multiplexer may output one of the out put of the pulse generation unit and an inverted output of the pulse generation unit to a first transmission path in response to an activated test mode enable signal from among the test mode enable signals.

The transmission delay measuring circuit may further include a third multiplexer which may output to the output terminal, in response to the activated test mode enable signal, the output of the corresponding first transmission path.

The transmission delay measuring circuit may further include an inversion circuit which may invert the output of the pulse generation unit.

The inversion circuit may be located in the input terminal of the pulse generation unit or in the output terminal of the pulse generation unit.

The transmission delay measuring circuit may further include a frequency division unit which may output a signal whose logic level transitions each time the measuring signal changes for N cycle(s).

The transmission delay measuring circuit may further include a pad which may output the measuring signal to an external measuring apparatus.

BRIEF DESCRIPTION OF THE DRAWINGS

Example embodiments will be more clearly understood from the following detailed description taken in conjunction with the accompanying drawings. FIGS. 1-4 represent non-limiting, example embodiments as described herein.

DETAILED DESCRIPTION OF EXAMPLE EMBODIMENTS

Reference will now be made in detail to example embodiments, examples of which are illustrated in the accompanying drawings. However, example embodiments are not limited to the embodiments illustrated hereinafter, and the embodiments herein are rather introduced to provide easy and complete understanding of the scope and spirit of example embodiments. In the drawings, the thicknesses of layers and regions are exaggerated for clarity.

It will be understood that when an element or layer is referred to as being "on," "connected to" or "coupled to" another element or layer, it may be directly on, connected or coupled to the other element or layer or intervening elements or layers may be present. In contrast, when an element is referred to as being "directly on," "directly connected to" or "directly coupled to" another element or layer, there are no intervening elements or layers present. Like reference numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle may, typically, have rounded or curved features and/or a gradient of implant concentration at its edges rather than a binary change from implanted to non-implanted region. Likewise, a buried region formed by implantation may result in some implantation in the region between the buried region and the surface through which implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
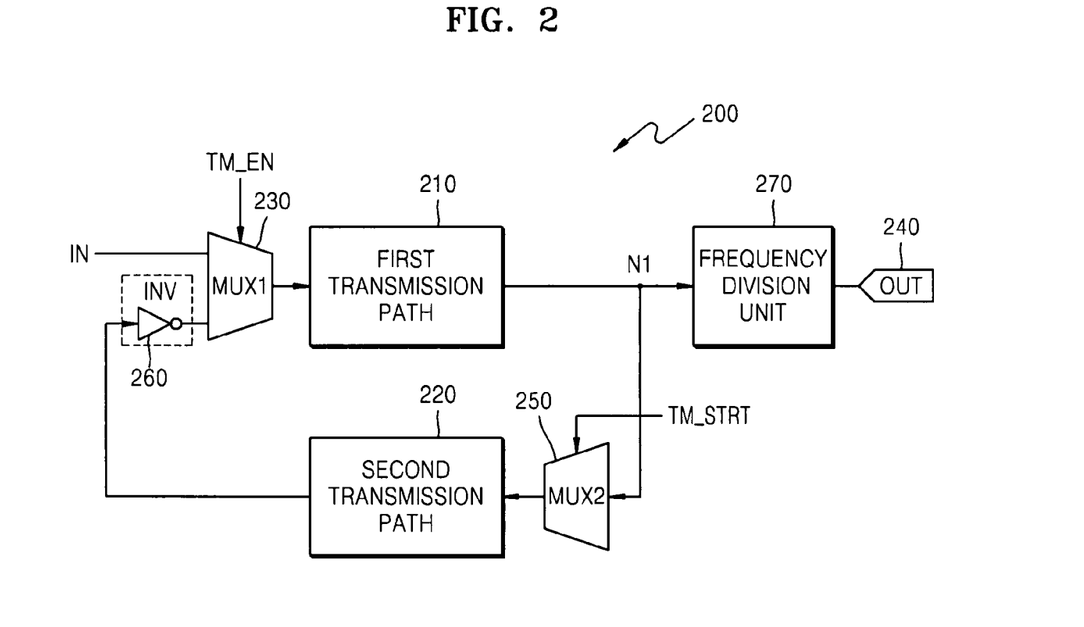
FIG. 2 is a block diagram of a transmission delay measuring apparatus according to an example embodiment.

FIG. 2 is a block diagram of a transmission delay measuring apparatus 200 according to an example embodiment. Referring to FIG. 2, the transmission delay measuring apparatus 200 may include a first transmission path 210, a second transmission path 220, a first multiplexer (MUX) 230, an inversion circuit 260, an output terminal 240, a second multiplexer (MUX) 250, and a frequency division unit 270. The second MUX 250 and the frequency division unit 270 may be optional. First, the transmission delay measuring apparatus 200 including only the first transmission path 210, the second transmission path 220, the first MUX 230, the inversion circuit 260, and the output terminal 240 will be described. Thereafter, the transmission delay measuring apparatus 200 including the second MUX 250 and/or the frequency division unit 270 in addition to the first transmission path 210, the second transmission path 220, the first MUX 230, the inversion circuit 260, and the output terminal 240 will be described.

An external input signal IN may be input to the first transmission path 210 via an input terminal (not shown). The transmission delay measuring apparatus 200 may measure a time required to transmit the external input signal IN to a first node N1 via the first transmission path 210 (e.g., a transmission delay of the first transmission path 210).

The first transmission path 210 may be a signal transmission line, a semiconductor circuit including at least one circuit device, or a combination of a semiconductor circuit and a signal transmission line. Examples of the semiconductor circuit may include a combinational circuit, a sequential circuit, and a circuit having a circuit combination (e.g., a combination of a combinational circuit and a sequential circuit).

The transmission delay measuring apparatus 200 may also be used to measure the transmission delays of semiconductor circuits having various configurations. However, the transmission delay measuring apparatus 200 may be more effective in measuring the transmission delay of the circuit portion included in a semiconductor device (not shown). When the transmission delay is small (e.g., several nanoseconds (ns) or several picoseconds (ps)), measuring an accurate transmission delay may be difficult. As such, the transmission delay measuring apparatus 200 may be more useful in this situation.

The second transmission path 220 may have the same configuration as that of the first transmission path 210. Accordingly, the transmission delay of the second transmission path 220 may be the same as that of the first transmission path 210. The equality between the transmission delays means not only that the two transmission delays may be physically the same, but also that the two transmission delays may have a negligible difference in measuring error.

The output of the first transmission path 210 may be directly input to the second transmission path 220 or input thereto via the second MUX 250 as illustrated in FIG. 2. In a normal mode, the second MUX 250 may block the output of the first transmission path 210 from being transmitted to the second transmission path 220, thereby reducing or preventing power from being consumed by the second transmission path 220 in the normal mode. On the other hand, in a test mode (e.g., an operational mode for measuring the transmission delay of the first transmission path 210), the second MUX 250 may allow the output of the first transmission path 210 to be transmitted to the second transmission path 220. The operation of the second MUX 250 will be described later in greater detail.

The inversion circuit 260 may be required for the two identical transmission paths 210 and 220 to form a ring oscillator having a closed loop configuration. In other words, the first transmission path 210, the second transmission 220, and the inversion circuit 260 may form a ring oscillator having a closed loop configuration.

In FIG. 2, the inversion circuit 260 located in the output terminal of the second transmission path 220 is illustrated. However, the location of the inversion circuit 260 may not be limited to the output terminal of the second transmission path 220 and may be in any location as long as the output of the second transmission path 220 is inverted. Thus, the inversion circuit 260 may be located either in the input terminal of the second transmission path 220, in the output terminal of the second transmission path 220, or within the second transmission path 220. As illustrated in FIG. 2, the inversion circuit 260 may be an inverter (INV). However, it will be understood by one of ordinary skill in the art to which the example embodiments pertain that the inversion circuit 260 may not be limited to the inverter.

In response to the test mode enable signal TM_EN, the first MUX 230 may output to the first transmission path 210 either the external input signal IN or a signal obtained by inverting the output of the second transmission path 220. When the test mode enable signal TM_EN is activated (e.g., in a test mode), the first MUX 230 may output to the first transmission path 210 the signal obtained by inverting the output of the second transmission path 220. On the other hand, when the test mode enable signal TM_EN is inactivated (e.g., in a normal operation mode), the first MUX 230 may output the external input signal IN to the first transmission path 210.

The test mode enable signal TM_EN may be activated when the transmission delay measuring apparatus 200 is in test mode and inactivated when the transmission delay measuring apparatus 200 is in normal operation mode. Thus, when the first transmission path 210 is used in a normal operation mode, the test mode enable signal TM_EN is inactivated and thus, the first MUX 230 may output the external input signal IN to the first transmission path 210. When the transmission delay of the first transmission path 210 is to be measured, the test mode enable signal TM_EN may be activated and thus, the first MUX 230 may output the output of the second transmission path 220 to the first transmission path 210.

In a test mode, the output terminal (OUT) 240 may output the output of the first transmission path 210 as a measuring signal to an external device for measuring the timing including a transmission delay. For convenience of explanation, it is illustrated in FIG. 2 that the output terminal 240 outputs the output of the first transmission path 210 as the measuring signal. However, the output terminal 240 may output as the measuring signal a signal of an arbitrary node of a closed loop formed with the first transmission path 210, the second transmission path 220, the inversion circuit 260, and the first MUX 230. Hence, the output terminal 240 may output as the measuring signal a signal of an arbitrary node included in the first or second transmission path 210 or 220, which may include a plurality of circuits.

The transmission delay measuring apparatus 200 may further include the second MUX 250, which may transmit the output of the first transmission path 210 to the second transmission path 220 in response to the test mode start signal TM_STRT. In other words, the second MUX 250 may determine whether or not to transmit a signal from the first transmission path 210 to the second transmission path 220.

The test mode start signal TM_STRT may be activated when a test mode starts. When the test mode start signal TM_STRT is activated, the second MUX 250 may output the output signal of the first transmission path 210 to the second transmission path 220. When the test mode start signal is inactivated, the second MUX 250 may not output the output signal of the first transmission path 210 to the second transmission path 220.

The transmission delay measuring apparatus 200 may further include the frequency division unit 270, which may output a signal whose logic level transitions each time the measuring signal (e.g., the output of the first transmission path 210 in FIG. 2) changes for a predetermined or given cycle of N (where N denotes an integer). As described above, in the transmission delay measuring apparatus 200, the first transmission path 210, the second transmission path 220, the inversion circuit 260, and the first MUX 230 (further including the second MUX 250 when the transmission delay measuring apparatus 200 includes the second MUX 250) form a ring oscillator.

The output of the ring oscillator (e.g., the output of the first transmission path 210) may be output as the measuring signal via the first node N1. In other words, the frequency division unit 270 may output a signal whose logic level transitions each time the cycle of the output of the ring oscillator changes by a predetermined or given cycle of N.

When the transmission delay measuring apparatus 200 includes both the second MUX 250 and the frequency division unit 270, the transmission delay of the first transmission path 210 may depend on the delay time of the first transmission path 210, a delay time of the second transmission path 220, a delay time of the first MUX 230, a delay time of the inversion circuit 260, a delay time of the second MUX 250, and a delay time of the frequency division unit 270 that may be generated from the moment the test mode start signal TM_START is activated.

The delays of the first and second MUXes 230 and 250 may be set to be smaller. When the ring oscillator loop formed of the first MUX 230, the first transmission path 210, the second MUX 250, the second transmission path 220, and the inversion circuit 260 operates for a N cycle, N may be set to be larger, and the frequency division unit 270 may divide the frequency of the measuring signal by 1/N. Hence, generation of the measuring error of the transmission delay of the first transmission path 210 may be reduced and the transmission delay of the first transmission path 210 may be more accurately measured.

Although not shown in FIG. 2, the transmission delay measuring apparatus 200 may further include a pad for outputting the measuring signal to an external measuring apparatus. The pad may be included in the output terminal 240 or between the output terminal 240 and the external measuring apparatus. When the frequent division unit 270 is included in the transmission delay measuring apparatus 200, the output terminal 240 may output the output of the frequency division unit 270. Thus, the pad may be used to output the output of the frequency division unit 270.

Figure 3:
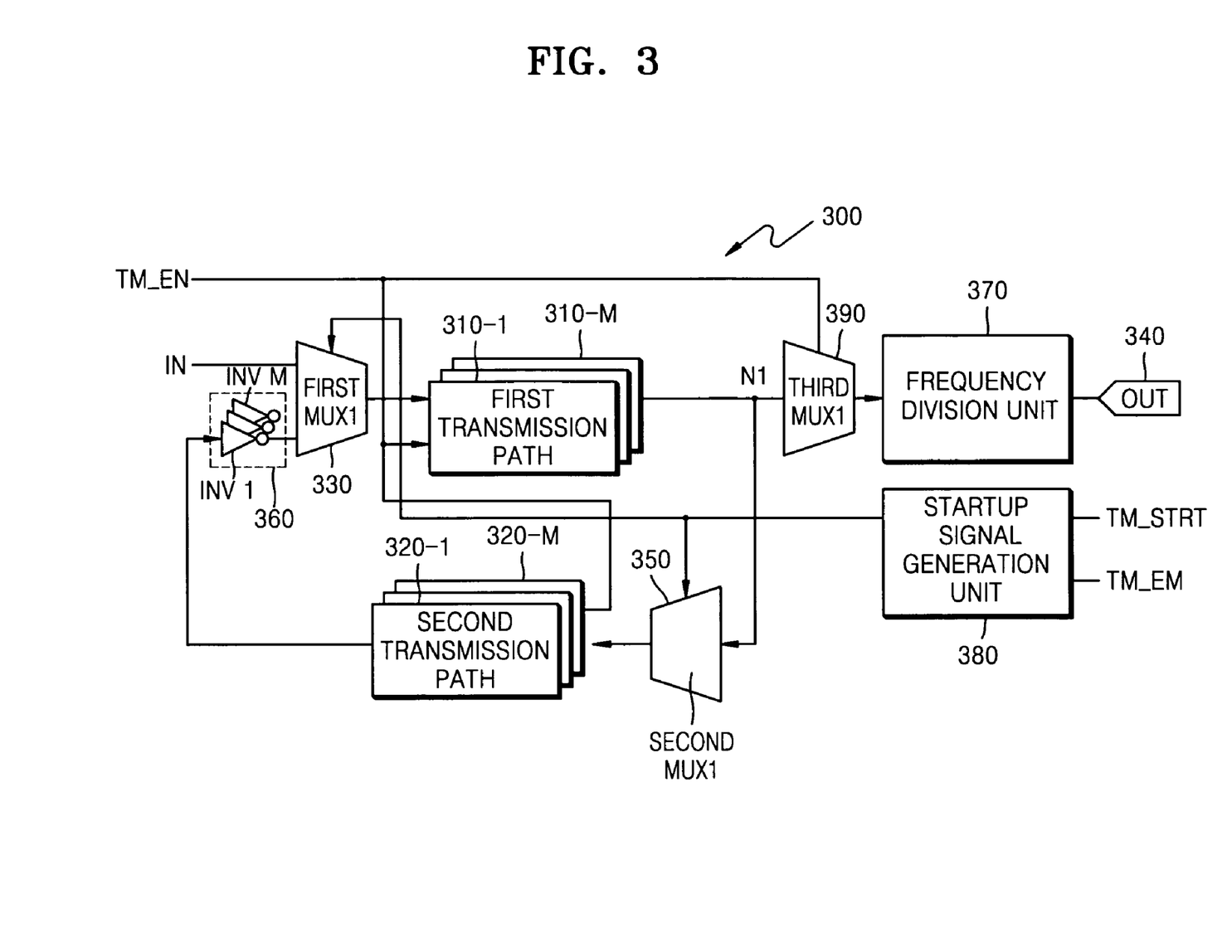
FIG. 3 is a block diagram of a transmission delay measuring apparatus according to an example embodiment.

FIG. 2 illustrates a single measuring signal being output via a single transmission path. However, example embodiments may also be applied to a plurality of measuring signals being output via a plurality of transmission paths. FIG. 3 is a block diagram of a transmission delay measuring apparatus 300 according to an example embodiment. FIG. 3 illustrates a plurality of measuring signals being used to measure transmission delays of a plurality of transmission paths.

In comparison to FIG. 2, the transmission delay measuring apparatus 300 may further include a plurality of first transmission paths 310-1 through 310-M and a plurality of second transmission paths 320-1 through 320-M. An inversion circuit 360 included in the transmission delay measuring apparatus 300 may include a plurality of inverters INV1 through INVM. The transmission delay measuring apparatus 300 may also include a startup signal generation circuit 380 and a third MUX 390. The first MUX 330, the second MUX 350, the inversion circuit 360, and the third MUX 390 may be arranged according to a combination of the first transmission paths and the second transmission paths. The scenario in which a plurality of measuring signals may be output via a plurality of transmission paths will now be described with reference to FIG. 3.

Referring to FIG. 3, when a plurality of first transmission paths 310-1 through 310-M are included, a plurality of second transmission paths 320-1 through 320-M having the same configurations as those of the first transmission paths may be included as well. In order to measure a transmission delay of one of the first transmission paths 310-1 through 310-M in test mode, a test mode enable signal TM_EN may be used to activate the first transmission paths 310-1 through 310-M and the second transmission paths 320-1 through 320-M (e.g., the third MUX 390 when the third MUX 390 is used).

In other words, a plurality of test mode enable signals TM_EN may be used to correspond to the first transmission paths 310-1 through 310-M. A signal may be transmitted to one of the first transmission paths 310-1 through 310-M and one of the second transmission paths 320-1 through 320-M that correspond to an activated test mode enable signal TM_EN from among the plurality of test mode enable signals TM_EN.

In response to the activated test mode enable signal TM_EN from among the plurality of test mode enable signals TM_EM, the first MUX 330 may output an inverted output signal of a second transmission path corresponding to the activated test mode enable signal TM_EN to a first transmission path corresponding to the activated test mode enable signal TM_EN. In response to the activated test mode enable signal TM_EN, the second MUX 350 may output the output of the first transmission path corresponding to the activated test mode enable signal TM_EN to the second transmission path corresponding to the activated test mode enable signal TM_EN.

The startup signal generation circuit 380 may output a startup signal that may be activated in response to the test mode enable signal TM_EN and the test mode start signal TM_STRT. When the startup signal generation unit 380 is included, the second MUX 350 may output the output of a first transmission path among the first transmission paths 310-1 through 310-M to a second transmission path corresponding to the first transmission path among the second transmission paths 320-1 through 320-M in response to the startup signal.

Moreover, when the startup signal generation unit 380 is included, the first MUX 330 may output either the external input signal IN or an inverted output of a second transmission path to a first transmission path in response to the startup signal As such, the plurality of first transmission paths 310-1 through 310-M may be formed so that the output of the first MUX 330 may be input to the first transmission path corresponding to the activated test mode enable signal TM_EN.

Although not described above in reference to FIG. 2, it may be understood by one of ordinary skill in the art to which the example embodiments pertain that the startup signal generation unit 380 may be applied to the transmission delay measuring apparatus 200 of FIG. 2.

Referring to FIG. 3, the transmission delay measuring apparatus 300 may further include the third MUX 390, which, in response to the activated test mode enable signal TM_EN, may output the output of a first transmission path corresponding to the activated test mode enable signal from among the first transmission paths 310-1 through 310-M to the output terminal 340. The third MUX 390 may enable measurement of the transmission delay of a desired first transmission path from among the first transmission paths 310-1 through 310-M.

The remaining not described operations of the transmission delay measuring apparatus 300 may be similar to those of the transmission delay measuring apparatus 200 of FIG. 2, and thus, detailed descriptions thereof will be omitted.

Figure 4:
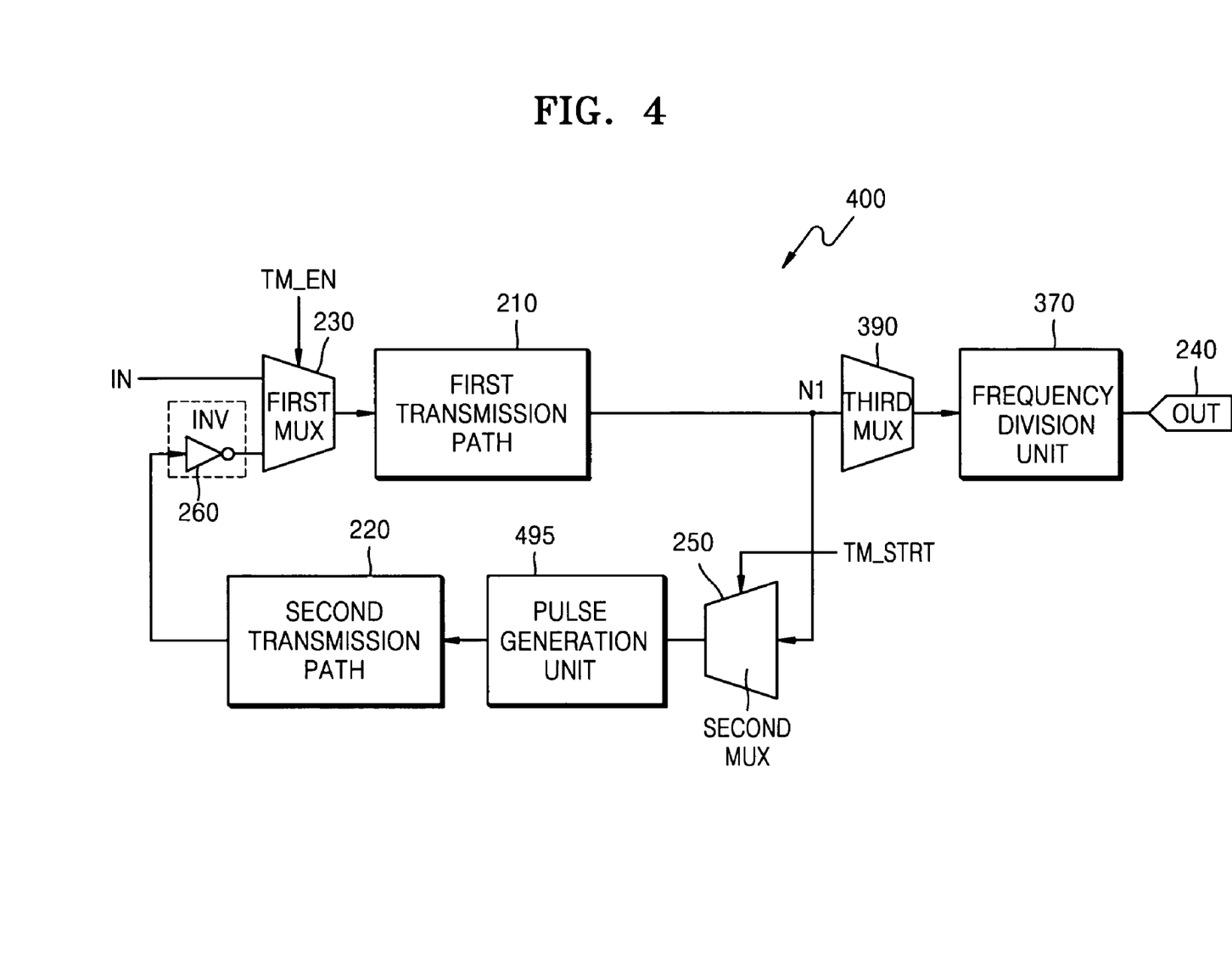
FIG. 4 is a block diagram of a transmission delay measuring apparatus according to an example embodiment.

FIG. 4 is a block diagram of a transmission delay measuring apparatus 400 according to an example embodiment. The transmission delay measuring apparatus 400 may measure the transmission delay of the first transmission path 210 when the logic level of the input of the first transmission path 210 transitions. In other words, the transmission delay measuring apparatus 400 may measure a delay time (e.g., a time during which a signal input to the first transmission path 210 transitions from logic high to logic low). To achieve this, the transmission delay measuring apparatus 400 may include a pulse generation unit 495. The pulse generation unit 495 may generate a pulse when the output of the first transmission path 210 transitions from a logic high level to a logic low level or vice versa and may output the pulse to the second transmission path 220. Thus, the transmission delay of the first transmission path 210 may be measured upon a logic level transition. This will now be described in greater detail with reference to FIG. 4.

The transmission delay measuring apparatus 400 may include the first transmission path 210, the second transmission path 220, the first MUX 230, the second MUX 250, the pulse generation unit 495, and the output terminal 240. As illustrated in FIG. 4, the structure of the transmission delay measuring apparatus 400 may be similar to that of the transmission delay measuring apparatus 200 of FIG. 2 with the exception of the pulse generation unit 495 being included. Thus, only those components different from the transmission delay measuring apparatus 200 will now be described.

In response to the test mode enable signal TM_EN, the first MUX 230 may output either one of the external input signal IN and an inverted output of the second transmission path 220, or one of the external input signal IN and the output of the second transmission path 220, depending on whether or not there is a change between the logic levels of the input and output of the first transmission path 210.

When the logic level of the output of the first transmission path 210 is an inverted logic level of the input of the first transmission path 210, the first MUX 230 may output either the external input signal IN or the inverted output of the second transmission path 220 in response to the test mode enable signal TM_EN. When the logic level of the output of the first transmission path 210 is the same as the logic level of the input of the first transmission path 210, the first MUX 230 may output either the external input signal IN or the output of the second transmission path 220 in response to the test mode enable signal TM_EN.

The second MUX 250 may output the output of the first transmission path 210 in response to the test mode start signal TM_STRT. The pulse generation unit 495 may generate a pulse in response to a change in the logic state of the output of the second MUX 250 and output the pulse to the second transmission path 220. Thus, in test mode, the pulse generation unit 495 may generate a pulse each time the logic state of the output of the first transmission path 210 transitions and transmit the pulse to the second transmission path 220.

The remaining not described operations of the transmission delay measuring apparatus 400 may be similar to those of the transmission delay measuring apparatus 200 of FIG. 2 and thus, detailed descriptions thereof will be omitted. It will be understood by one of ordinary skill in the art to which the example embodiments pertain that the transmission delay measuring apparatus 400 may also apply when a plurality of first transmission paths 210 are included. In this case, the operation of the transmission delay measuring apparatus 400 may be similar to that of the transmission delay measuring apparatus 300 of FIG. 3 and thus, a detailed description thereof will be omitted.

In a conventional method of measuring a transmission delay of a first transmission path in a closed loop having no second transmission paths, the sum of the time during which a signal input to the first transmission path transitions from a logic high level to a logic low level and a time during which the signal input to the first transmission path transitions from a logic low level to a logic high level may be measured as the transmission delay of the first transmission path based upon the logic level transition. However, in example embodiments, when a signal transitions from a logic high level to a logic low level or vice versa in a closed loop having no second transmission paths as in the conventional art, the transmission delay when the signal transitions from a logic high level to a logic low level and a transmission delay when the signal transitions from a logic low level to a logic high level may be measured separately.

A transmission delay measuring apparatus according to example embodiments may include a first transmission path, a first MUX, a second MUX, a pulse generation unit, and an output terminal. The second MUX may output the output of the first transmission path in response to a test mode start signal.

The pulse generation unit may generate a pulse in response to a change in the logic level of the output of the second MUX and output the pulse. In response to the test mode enable signal, the first MUX may output either one of an external input signal and an inverted output of the pulse generation unit, or one of the external input signal and the output of the pulse generation unit, depending on whether or not there is a change between the logic levels of the input and output of the first transmission path.

Even when no second transmission paths are included, the remaining not described operations of the transmission delay measuring apparatus may be similar to those of the transmission delay measuring apparatus 400 of FIG. 4 and thus, detailed descriptions thereof will be omitted.

As described above, a transmission delay measuring apparatus according to example embodiments may more accurately measure a transmission delay of a transmission path in a semiconductor device in a die-to-die wafer state or a package state. As such, the transmission delay measuring apparatus may contribute to the analysis of the characteristics of a semiconductor device and may aid in the improvement of the yield of the semiconductor device.

The foregoing is illustrative of example embodiments and is not to be construed as limiting thereof. Although example embodiments have been described, those skilled in the art will readily appreciate that many modifications are possible in example embodiments without materially departing from the novel teachings and advantages of example embodiments. Accordingly, all such modifications are intended to be included within the scope of the claims. Therefore, it is to be understood that the foregoing is illustrative of example embodiments and is not to be construed as limited to the specific embodiments disclosed, and that modifications to the disclosed embodiments, as well as other embodiments, are intended to be included within the scope of the appended claims. Example embodiments are defined by the following claims, with equivalents of the claims to be included therein.

What is claimed is:

1. A transmission delay measuring circuit comprising:
   at least one first transmission path;
   a transmission unit receiving an output of the at least one first transmission path;
   an inversion circuit inverting an output of the transmission unit;
   a first multiplexer outputting one of an external input signal and an output of the inversion circuit to the at least one first transmission path in response to at least one test mode enable signal; and
   an output terminal outputting, as a measuring signal, a signal in an arbitrary node of a closed loop formed of the at least one first transmission path, the transmission unit, the inversion circuit, and the first multiplexer,
   wherein the closed loop further includes a second multiplexer transmitting the output of the at least one first transmission path in response to a test mode start signal,
   the transmission unit includes at least one second transmission path having the same structure as the structure of the at least one first transmission path and a pulse generation unit generating a pulse in response to a change in the logic state of an output of the second multiplexer and outputting the pulse to the at least one second transmission path, and
   the first multiplexer outputs either one of the external input signal and an inverted output of the at least one second transmission path or one of the external input signal and the output of the at least one second transmission path according to a change or non-change between logic states of an input and the output of the at least one first transmission path.

2. The transmission delay measuring circuit of claim 1, further comprising:
   a startup signal generation unit outputting a startup signal that is activated in response to the at least one test mode enable signal and the test mode start signal,
   wherein the second multiplexer transmits the output of the at least one first transmission path in response to the startup signal.

3. The transmission delay measuring circuit of claim 1, wherein at least two first transmission paths are serially connected to each other and at least two second transmission paths are serially connected to each other.

4. The transmission delay measuring circuit of claim 3, wherein:
   the at least one first transmission path includes at least two first transmission paths, the at least one second transmission path includes at least two second transmission paths, and the at least one test mode enable signal includes at least two test mode enable signals;
   the first multiplexer outputs either the output of the at least one second transmission path or the inverted output of the corresponding second transmission path to the corresponding first transmission path in response to an activated test mode enable signal; and the second multiplexer outputs an output of the pulse generation unit to the corresponding second transmission path in response to the activated test mode enable signal.

5. The transmission delay measuring circuit of claim 4, further comprising:

a third multiplexer outputting to the output terminal, in response to the activated test mode enable signal, a signal in an arbitrary node of a closed loop formed of the first multiplexer, the corresponding first transmission path, the second multiplexer, the pulse generation unit, and the corresponding second transmission path.

6. The transmission delay measuring circuit of claim 1, wherein the inversion circuit is in an input terminal of the at least one second transmission path, in an output terminal of the at least one second transmission path, within the at least one second transmission path, in an input terminal of the pulse generation unit, or in an output terminal of the pulse generation unit.

* * * * *